(12) United States Patent
Goettfert

(10) Patent No.: US 10,135,468 B2
(45) Date of Patent: Nov. 20, 2018

(54) DECODER AND METHOD FOR PHYSICALLY UNCLONABLE FUNCTIONS USING THRESHOLD DECODING

(71) Applicant: Infineon Technologies AG, Neubiberg (DE)

(72) Inventor: Rainer Goettfert, Putzbrunn (DE)

(73) Assignee: Infineon Technologies AG, Neubiberg (DE)

( * ) Notice: Subject to any disclaimer, the term of this patent is extended or adjusted under 35 U.S.C. 154(b) by 1113 days.

(21) Appl. No.: 13/950,894

(22) Filed: Jul. 25, 2013

(65) Prior Publication Data

US 2014/0032990 A1    Jan. 30, 2014

(30) Foreign Application Priority Data

Jul. 25, 2012 (DE) .................. 10 2012 213 040

(51) Int. Cl.

| H03M 13/00 | (2006.01) |
|---|---|
| H03M 13/43 | (2006.01) |
| H04L 9/08 | (2006.01) |
| H04L 9/32 | (2006.01) |
| H03M 13/15 | (2006.01) |

(52) U.S. Cl.
CPC .......... *H03M 13/43* (2013.01); *H04L 9/0866* (2013.01); *H04L 9/3278* (2013.01); *H03M 13/15* (2013.01)

(58) Field of Classification Search
CPC ......... H04L 9/32; H04L 9/3278; G06F 17/10; H03M 13/43; H03M 13/37; H03M 13/159; H03M 13/15

USPC .......................................... 714/752, 760, 785
See application file for complete search history.

(56) References Cited

U.S. PATENT DOCUMENTS

| 3,728,678 A | * | 4/1973 | Tong ..................... H04L 1/0059 |
|---|---|---|---|
| | | | 714/787 |
| 4,119,945 A | * | 10/1978 | Lewis, Jr. ............. H03M 13/35 |
| | | | 375/E7.28 |
| 4,667,327 A | * | 5/1987 | Bright .............. G01R 31/31853 |
| | | | 714/775 |

(Continued)

FOREIGN PATENT DOCUMENTS

EP         2240848 B1    8/2011

*Primary Examiner* — Albert Decady
*Assistant Examiner* — Osman M Alshack
(74) *Attorney, Agent, or Firm* — Murphy, Bilak & Homiller, PLLC

(57) ABSTRACT

A decoder includes a feedback shift register having a plurality of register elements that implement a simplex code and take a register vector for determining an appropriate syndrome fed into the feedback shift register and stored in the plurality of register elements. A combination device algebraically combines a subset of the register elements and provides a combination result vector. A majority decision-making unit ascertains a most frequently occurring value within the combination result vector and provides it as a decision result. An input selector connects an input of the feedback shift register to an input interface arrangement or to an output of the majority decision-making unit, and provides an input vector by the input interface arrangement and corresponds to the ascertained form of the physical unclonable properties as a register vector and, and provides a decision vector comprising the decision result and further decision results as a register vector.

12 Claims, 13 Drawing Sheets

(56) References Cited

U.S. PATENT DOCUMENTS

| | | | | |
|---|---|---|---|---|
| 4,747,105 | A * | 5/1988 | Wilson | H03M 13/33 375/368 |
| 5,657,331 | A * | 8/1997 | Metzner | H03M 13/17 714/761 |
| 5,729,559 | A * | 3/1998 | Bright | H03M 13/43 714/786 |
| 8,386,990 | B1 * | 2/2013 | Trimberger | H01L 23/544 257/798 |
| 8,412,950 | B2 * | 4/2013 | Kevenaar | G06F 21/32 713/186 |
| 2006/0210082 | A1 * | 9/2006 | Devadas | G06F 21/31 380/277 |
| 2009/0077449 | A1 * | 3/2009 | Lee | H03M 13/15 714/785 |
| 2011/0066670 | A1 * | 3/2011 | Yu | G06F 7/582 708/252 |
| 2013/0044874 | A1 * | 2/2013 | Murray | H04L 9/0866 380/44 |
| 2013/0094648 | A1 * | 4/2013 | Goettfert | H04L 9/28 380/28 |
| 2013/0094649 | A1 * | 4/2013 | Tomlinson | H04L 9/304 380/30 |

* cited by examiner

DECODER AND METHOD FOR PHYSICALLY UNCLONABLE FUNCTIONS USING THRESHOLD DECODING

PRIORITY CLAIM

This application claims priority to German Patent Application No. 10 2012 213 040.3, filed on 25 Jul. 2012, the content of said German application incorporated herein by reference in its entirety.

BACKGROUND

Physical unclonable functions (PUF) afford an auspicious mechanism that can be used in many safety-relevant, data-protection-related and digital-rights-related applications. A physical unclonable function can be regarded as a function that is embodied in or by means of a physical structure and that, although relatively simple to evaluate, can be predicted only with very great difficulty. In addition, an individual PUF medium is typically easy to produce but practically impossible to duplicate with respect to the PUF, even using exactly the same production method.

Another name for the physical unclonable function is a physical hash function. The idea of physical unclonable functions or PUFs is to digitize physical properties of an object and thus to obtain a bit sequence (number) that is associated with the object. In this case, it is desirable for the bit sequences of two different physical objects to be uncorrelated. A simple example for purposes of illustration is a sheet of paper. When viewed under a microscope, it is possible to see a special fine structure of wood chips or cellulose portions. The structure is measured using a suitable algorithm and the result is presented as a bit sequence. This bit sequence is the PUF. Another sheet of paper generally produces a bit sequence that is uncorrelated with the bit sequence of the first sheet of paper.

The process for producing a bit sequence (the actual PUF thereof) from the properties of the physical object is called PUF generation. It is a typical aim for the PUF generation to be efficient.

A desirable property of a PUF generation mechanism is that the same physical object produces the same bit sequence each time in the course of fresh PUF generation (that is to say in the course of a freshly made PUF request). However, this is typically not the case. Repeated PUF generation for the same physical object provides bit sequences that, although very similar to one another, are generally not identical to one another. This discrepancy is typically compensated for by using methods from coding theory (error correction). In this case, the error correction is typically carried out by a piece of special hardware or by a processor that executes an appropriate software program. It is desirable for the error correction to be made as efficient as possible in terms of hardware complexity and/or computation complexity.

SUMMARY

According to an embodiment, a decoder for evaluating an ascertained form of physical unclonable properties of a physical object includes a feedback shift register having a plurality of register elements configured to implement a simplex code and configured to take a register vector that is fed into the feedback shift register as a basis for determining an appropriate syndrome and storing it in the plurality of register elements. A combination device is configured to algebraically combine at least one subset of the register elements of the feedback shift register and to provide a resultant combination result vector. A majority decision-making unit is configured to ascertain a most frequently occurring value within the combination result vector and to provide it as a decision result. An input selector is configured to in a first state, selectively connect an input of the feedback shift register to an input interface arrangement or to an output of the majority decision-making unit, to provide an input vector, wherein the input vector is provided by the input interface arrangement and corresponds to the ascertained form of the physical unclonable properties as a register vector and, and in a second state, to provide a decision vector, wherein the decision vector comprises the decision result and further decision results as a register vector.

According to another embodiment, a decoder for evaluating an input vector that corresponds to an ascertained form of physical unclonable properties of a physical object includes A syndrome calculator configured to take the input vector as a basis for determining an appropriate simplex code syndrome. A majority decision logic unit is configured to evaluate a current state of the syndrome calculator for each clock cycle and to use disjunct evaluation of state elements and majority decision to determine a current decision result. A decision feedback loop is configured to feed back the current decision result to an input of the syndrome calculator during at least one phase of a decoding cycle, wherein during the at least one phase the syndrome calculator is configured to determine a decision syndrome. A decision vector memory is configured to store the decision results determined during the at least one phase as elements of a decision vector. An input vector corrector is configured to combine the input vector with the decision vector to provide a corrected input vector.

According to another embodiment, a method for evaluating an ascertained form of physical unclonable properties of a physical object includes ascertaining a simplex-code-based syndrome using a feedback shift register on the basis of an input vector that corresponds to the ascertained form of the physical object. The simplex-code-based syndrome is combined with a reference syndrome that corresponds to a reference form of the physical unclonable property algebraically to obtain a combined syndrome. The combined syndrome is filtered using a filter logic unit to obtain a combination vector, wherein each combination vector element of the combination vector is obtained from a subset of combined syndrome elements and wherein the subsets associated with the individual combination vector elements are disjunct. A majority decision is made on the combination vector elements to obtain a decision result that indicates what value occurs most frequently within the combination vector elements. The decision result is stored as a correction vector element of a correction vector. The decision result is fed as a new input vector element into the feedback shift register to obtain a modified simplex-code-based syndrome. The steps of filtering, making, storing and feeding are repeated, wherein the simplex-code-based syndrome modified during the preceding execution takes on the role of the combined syndrome.

According to another embodiment, a method for operating a decoder for evaluating an ascertained form of physical properties of a physical object comprises receiving an input vector that corresponds to the ascertained form of the physical unclonable properties. An input selector for a feedback shift register is actuated such that the input vector is fed into the feedback shift register as a register vector, wherein the feedback shift register ascertains a simplex-code-based syndrome for the register vector during feeding. A logic circuit is evaluated in order to combine the simplex-code-based syndrome with a reference syndrome in order to obtain a combined syndrome, wherein the reference syndrome corresponds to a reference form of the physical unclonable property. The input selector is actuated such that a decision result is fed into the feedback shift register as a new register input, wherein the decision result is obtained from filtering of the combined syndrome using a filter logic unit in order to provide a combination vector and a majority decision on appropriate combination vector elements, wherein the decision result indicates what value occurs most frequently within the combination vector elements. The decision result is stored as a correction vector element. The feedback shift register is actuated in order to shift the register elements to obtain a modified register vector. A further decision result, which is ascertained by means of the filter logic unit and the majority decision on the basis of the modified register vector, is fed into the feedback shift register as a new register vector element.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 12 shows a schematic diagram of a (7, 3, 4) simplex code-implemented feedback shift register after an input vector has been fed in.

DETAILED DESCRIPTION

Before exemplary embodiments of the present invention are described in detail below with reference to the appended figures, it is pointed out that the same elements or elements having the same function are provided with the same or similar reference symbols and that elements that are provided with the same reference symbols are not described repeatedly. Descriptions for elements having the same or similar reference symbols are therefore interchangeable with one another.

A typical aim of PUF reconstruction is to use a simple circuit with low hardware complexity to perform the task of determining the true PUF value from the current PUF value. This can be achieved using methods from coding theory (error correction), for example. In this case, the procedure may be as follows:

A physical object is given. The first PUF bit sequence a associated with the object is produced, and a is labeled the true PUF value. From the true PUF value a, an associated auxiliary vector b is calculated. The auxiliary vector b is regarded as a publically accessible piece of information. By way of example, b is stored in an environment that is not very secure. The true PUF value a itself is strictly secret and is not stored at all for later use and is therefore also no longer directly available at a later time. The true PUF value a can be used within the context of production thereof as a key or for producing a key in order to encrypt data that are stored on the respective physical object. Upon later fresh PUF generation, a new PUF value r is obtained. The value r is generally not identical to a, but differs from a only slightly. The aim is to recover the true PUF value a. The recovered true PUF value a can then be used to decrypt the encrypted data again, for example.

A previous solution is based on a decoder for the (23, 12, 7) Golay code. The (23, 12, 7) Golay code can be used to correct up to three bit errors for a bit sequence of length 23. The hardware implementation for the corresponding decoder without an interface register is 2100 GE (gate equivalents, where one GE is the silicon area for a NAND gate).

The embodiments disclosed herein are based on the simplex code instead of the Golay-code-based decoders or decoders that are based on other codes.

Figure 1:
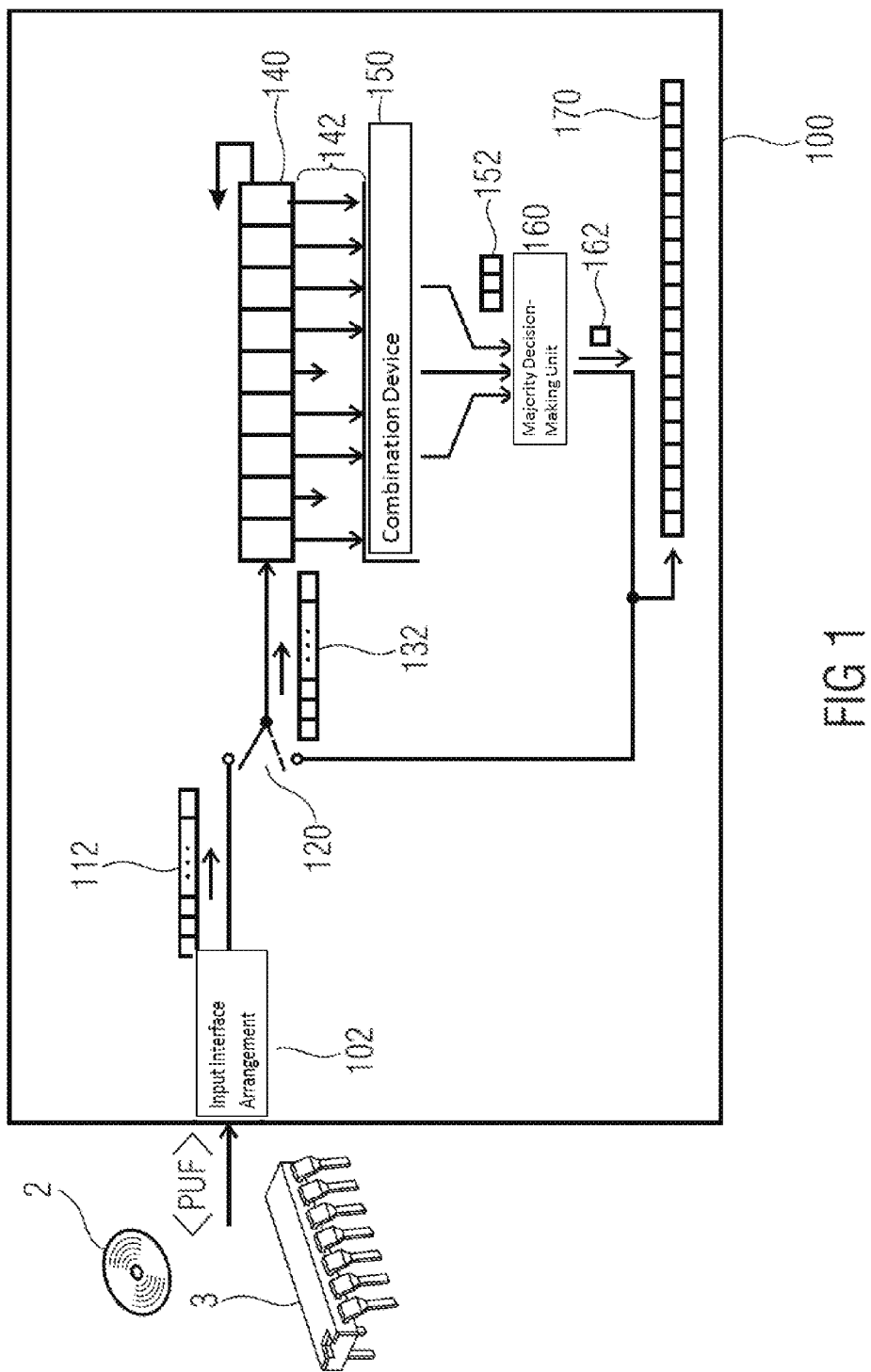
FIG. 1 shows a schematic block diagram of a decoder based on an exemplary embodiment.

FIG. 1 shows a schematic block diagram of a decoder 100 according to an embodiment. The decoder 100 is provided for the purpose of decoding a physical unclonable function PUF and correcting random errors that occur therein, in particular. The physical unclonable function PUF is typically represented in the form of a bit sequence or a digitally coded number. FIG. 1 shows a CD-ROM 2 (alternatively also a DVD, Bluray or other data storage medium) and an electronic component 3 as possible examples of sources of a physical unclonable function. The CD-ROM 2 and the electronic component 3 can accordingly each be regarded as a physical object that has physical unclonable properties. In the case of the CD-ROM 2, these may be optical properties of the surface or surface structure of the CD-ROM 2, for example. In the case of the electronic component 3, the physical unclonable function may be implemented as what is known as a hardware PUF, for example in the form of a ring oscillator PUF or an arbiter PUF. Other options for producing the PUF are likewise conceivable.

Each time the PUF of the physical object (for example the CD-ROM 2) is evaluated, a new ascertained form of the physical unclonable properties of the physical object is obtained. Although the various ascertained forms are usually very similar, they differ from one another to some extent on account of random influences. If the PUF is represented by a bit sequence, for example, most bits from two different ascertained forms of the physical unclonable properties are typically identical. However, a typically small number of bits differ from one first ascertained form to a second ascertained form of the physical unclonable properties of the physical object 2 or 3.

Among the ascertained forms of the physical unclonable properties, a reference form or a true PUF value may be labeled as such. This reference form is ascertained in connection with writing or programming of the physical object 2, 3, for example, as a result of which the data to be written or programmed can be encrypted prior to writing or programming using a cryptographic key that is based on the ascertained reference form of the respective physical object. The useful data to be written or programmed are thus written to or programmed into various physical objects in differently encrypted form on the basis of the PUF relating to the individual physical object. In this way, when the data is read, it is possible to check whether the written or programmed data was actually intended for the present physical object from which it has been read. In particular, decryption of the data will usually fail if a different physically unclonable function is used for it than that which was used for encryption. Since the key for encryption was produced using the PUF of a first physical object and, for example in the case of unauthorized duplication of the encrypted data from this first physical object to a second physical object, at the time of decryption only a key that was produced using the PUF of the second physical object is available, the decryption will usually fail. Although, in the case of fraudulent intent, it would also be possible for either the PUF of the first physical object or the relevant key directly to be provided for decryption (for example by means of a further data storage medium or a datalink), this key belonging to the first physical object would then need to be used for the decryption and the key belonging to the second physical object would need to be ignored. This is typically possible only if the circuit used for decryption permits corresponding manipulation.

The decoder 100 shown as a schematic block diagram in FIG. 1 comprises an input interface arrangement 102, a feedback shift register 140 having a plurality of register elements, a combination device 150, a majority decision-making unit 160 and an input selector 120. The physical unclonable function enters the decoder 100 via the input interface arrangement 102. The input interface arrangement 102 provides the physical unclonable function in the form of an input vector 112 for the other components of the decoder 100, particularly for the feedback shift register 140. The input interface arrangement 102 is connected to one of the selectable ports or inputs of the input selector 120. In a first state of the input selector 120, the input interface arrangement 102 is connected to an input register element of the feedback shift register 140. In this way, the input vector 112, which corresponds to the form of the physical unclonable properties of the physical object 2 or 3 that is ascertained at the current time, can be fed into the feedback shift register 140 as a register vector 132.

The feedback shift register 140 uses specially selected feedback loops (indicated by the bent arrow at the right-hand end of the shift register) from, typically, a plurality of register elements to the input register element to implement a simplex code. The family of simplex codes is the dual codes of the Hamming codes.

The simplex code is proposed as a basis for the PUF reconstruction and also for calculation of a requisite auxiliary vector. The simplex code has a few beneficial properties. First, the simplex code has a high minimum distance. The simplex code is cyclic and syndromes can therefore be calculated efficiently in hardware using a shift register that is obtained from the generator polynomial. In addition, the simplex code is completely threshold-encodable and threshold-decodable, which allows for efficient decoding in hardware. Particularly, this threshold-decodability distinguishes the simplex code from other codes, since only few cyclic codes are completely threshold-decodable. By way of example, the (23, 12, 7) Golay code is only threshold-decodable for 1-bit errors. The 2-bit and 3-bit errors that can likewise be corrected by the (23, 12, 7) Golay code, in principle, cannot be corrected in this manner, i.e. using threshold-decoding. The simplex code and the properties thereof are explained in even more detail further below.

When the complete register vector 132 has been fed into the feedback shift register 140, the values stored in the register element represent a corresponding simplex code syndrome for the register vector 132 that has been fed in. It should be noted that the register vector 132 and also the input vector 112 are usually longer than the feedback shift register 140. In other words, the register vector 132 comprises more vector elements than there are register elements in the feedback shift register 140. The reference symbol 142 denotes the simplex code syndrome that is provided at a parallel output of the feedback shift register 140.

The feedback shift register 140 is connected to the combination device 150 by means of a multiplicity of connections. In the exemplary embodiment shown in FIG. 1, only a few of the register elements of the feedback shift register 140 are connected to the combination device 150 by means of relevant connections. Typically, however, all of the register elements of the shift register 140 are connected to the combination device 150 by means of the connections. The combination device 150 is configured to algebraically combine the syndrome components stored in the (selected) register elements with one another such that a resultant combination result vector 152 is provided at an output of the combination device 150. In the exemplary embodiment shown in FIG. 1, the resultant combination result vector 152 comprises three vector elements, that other values are naturally also conceivable. If the syndrome components have binary encoding (i.e. as bits), the algebraic combination may be implemented particularly as a logic combination using appropriate AND gates, OR gates and/or XOR gates. According to some exemplary embodiments, the algebraic combination performed by the combination device 150 may be disjunct in relation to the syndrome elements or the register elements. This means that each syndrome component is used to calculate no more than one combination vector component. In other words, each combination vector component is dependent on a different subset of the syndrome components (stored in the register elements of the feedback shift register 140), with the respective subsets not overlapping, i.e. no register element belongs to more than one subset.

In some exemplary embodiments, the combination device 150 may comprise a multiplicity of input interface elements and a multiplicity of output interface elements. Each of the output interface elements may be linked to a subset of the multiplicity of input interfaces by means of an individual algebraic function. Typically, the subset does not overlap with other subsets that are ascribed to other output interface elements.

The combination vector 152 may comprise a multiplicity of combination vector elements. The combination device 150 may be configured to determine the combination vector elements in each case on the basis of current values of mutually disjunct subsets of the register elements.

The decoder 100 may also comprise a monitoring device that is configured to monitor the feedback shift register 140 for a zero state and, upon detection of the zero state, to output a signal. This signal indicates that all detectable errors within the input vector 112 have already been detected. Hence, the error detection can actually be terminated prematurely, which shortens the processing time and allows the power consumption of the decoder to be reduced.

Since the simplex code is threshold-decodable, the resultant combination result vector 152 can be supplied to the majority decision-making unit 160, which evaluates the individual combination result vector elements and ascertains a value that occurs most frequently therein, which is then provided as a decision result 162 at an output of the majority decision-making unit 160. The decision result 162 can be supplied to the input register element of the feedback shift register 140 via the input selector 120 when the input selector 120 is in a second state. In addition, the decision result 162 is also fed into a further shift register 170 in order to buffer-store it in this manner for the time being.

The feedback shift register 140 is now cyclically advanced a number of cycles, this number typically corresponding to the length of the input vector 112 or of the register vector 132. During each cycle, the combination device 150 re-evaluates the present state of the feedback shift register 140 and provides an appropriate new combination result vector 152. The majority decision-making unit 160 also re-determines the value that occurs most frequently in the new combination result vector 152 and transmits it to the input selector 120, and hence also the input register element of the feedback shift register 140, as a new decision result 162. The new decision result 163 is in turn fed into the shift register 170, the previously ascertained decision results that are already stored therein being shifted one register cell onward. The shift register 170 typically has the same length as the input vector 112. After the aforementioned number of cycles (corresponding to the length of the input vector 112) have been performed, the shift register 170 is therefore completely filled with the decision results ascertained in the respective cycles. By way of example, these decision results are correction bits for the input vector 112, as a result of which a corrected input vector can be ascertained by means of suitable combination of the decision results with the input vector 112. If the decoding and error correction were successful, the corrected input vector corresponds to the reference vector (corresponding to the reference form) that was used in connection with the original writing or programming of the physical object, and possibly also for encrypting the useful data stored on the physical object.

Figure 2:
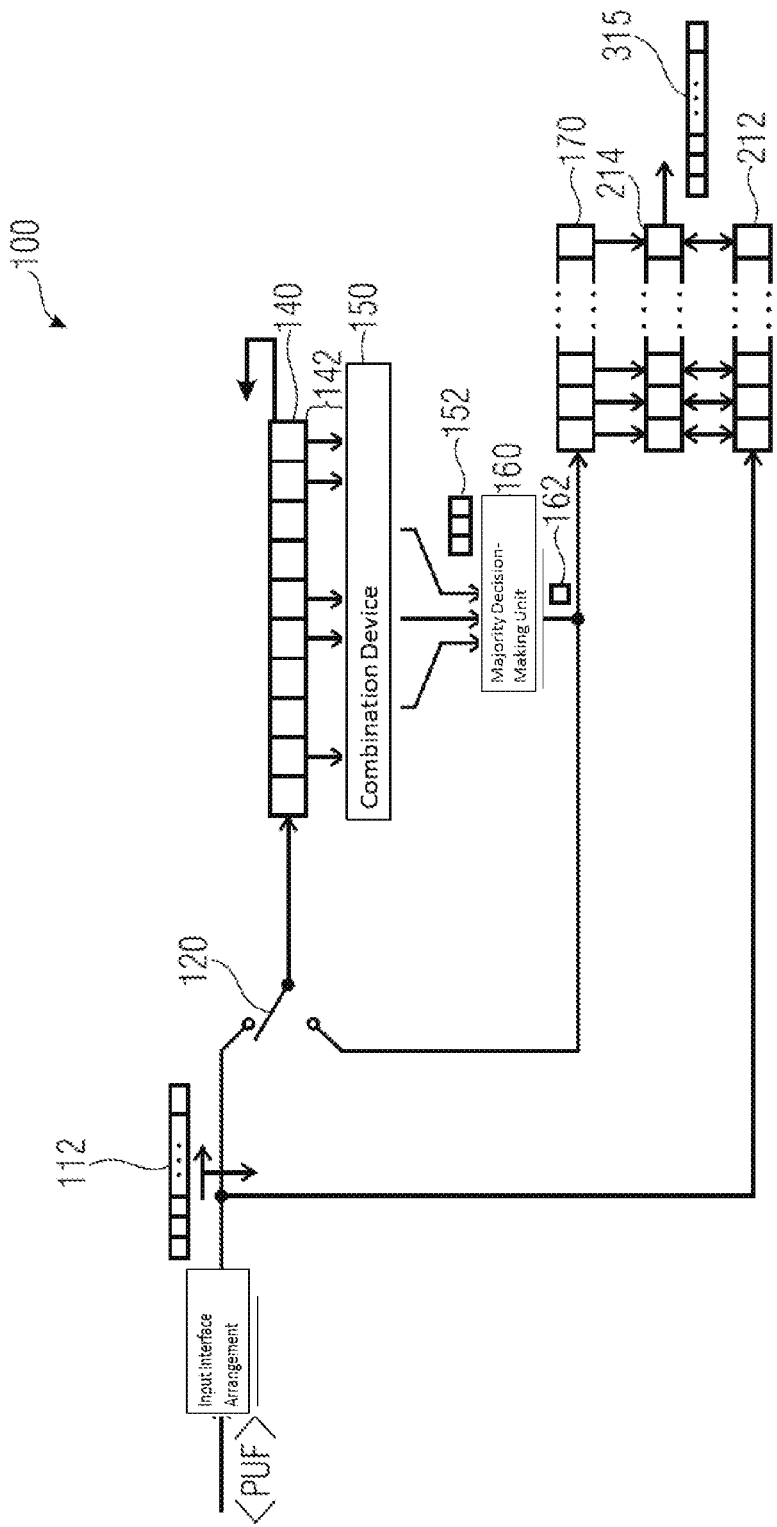
FIG. 2 shows a schematic block diagram of a decoder based on a further exemplary embodiment, which additionally comprises a decision vector memory and an input vector corrector.

FIG. 2 shows a schematic block diagram of a decoder 100 based on a further exemplary embodiment, which is distinguished from the exemplary embodiment shown in FIG. 1 particularly by the addition of an input vector memory 212 and an input vector corrector 214. As already explained in connection with FIG. 1, the majority decision-making unit 160 produces a decision result 162 for each cycle of a second phase of the PUF reconstruction, which decision result forms a vector element of the decision vector that is stored in the decision vector memory 170. The decision vector can also be regarded as a correction vector. When the second phase of the PUF reconstruction is complete, that is to say that the decision vector memory 170 is completely filled with the decision vector, the input vector 112 stored in the input vector memory 212 can be corrected using the input vector corrector 214. The corrected input vector 215 is provided at an output of the input vector corrector 214 when correction has been performed. By way of example, the input vector 112 can be corrected by bit-by-bit XORing of the decision vector stored in the decision vector memory 170 and of the input vector 112 (stored in the input vector memory 212).

Figure 3:
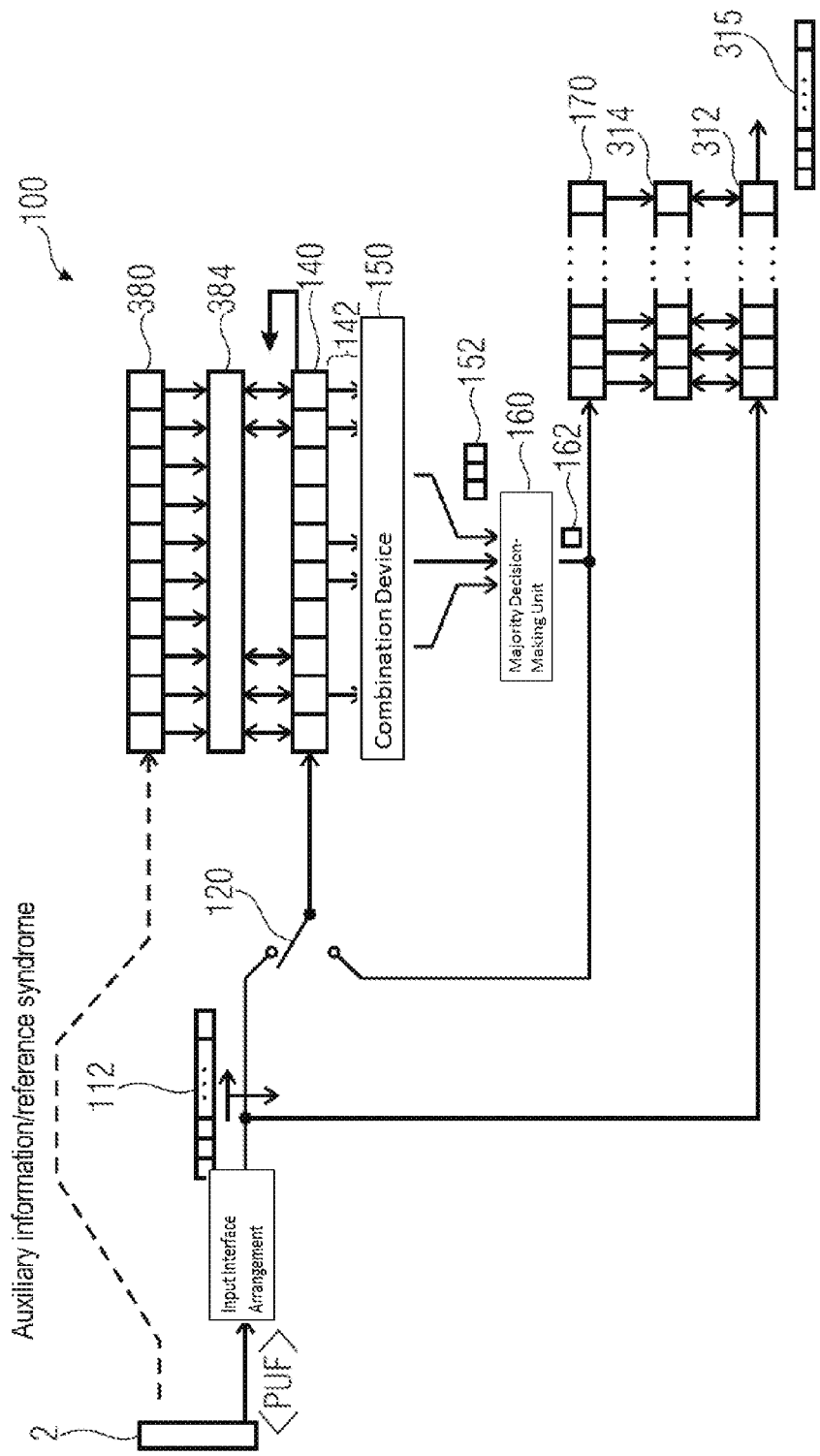
FIG. 3 shows a schematic block diagram of a decoder based on a further exemplary embodiment, which is distinguished from the exemplary embodiment shown in FIG. 2 by a different implementation of the input vector corrector.

FIG. 3 shows a schematic block diagram of a decoder based on a further exemplary embodiment. The exemplary embodiment in FIG. 3 differs from the exemplary embodiment from FIG. 2 in terms of the input vector corrector 314 and the input vector memory 312. Furthermore, the decoder 100 based on the exemplary embodiment shown in FIG. 3 comprises an auxiliary information memory 380 and a reference syndrome combiner 384.

Whereas the input vector corrector 212 in FIG. 2 is suitable for, by way of example, serial output and possibly buffer-storage of the corrected input vector 215, the input vector corrector 314 in FIG. 3 is designed such that it returns the corrected vector elements of the corrected input vector 315 to the input vector memory 312. Hence, the input vector memory 312 stores the corrected input vector 315 after the correction has been performed, which input vector can then be read serially, for example, from the input vector memory 312.

The decoder 100 for evaluating an ascertained form of physical unclonable properties of a physical object is typically operated in two successive phases, with possibly an intermediate step or a plurality of intermediate steps being able to be provided between the two phases. In each of the two phases, typically a plurality of cycles are executed. During each cycle, the feedback shift register 140 is instructed to shift its register element contents by one register element, and also to read the value applied to the input register element into the input register element. It should be noted that the value that is applied to the input register element and that is intended to be read in may typically also be a function of the feedback of the feedback shift register 140, for example an XOR combination of the value of the last register element (in FIGS. 1 to 3 the register element at the right-hand end of the feedback shift register 140) and of a value provided by the input selector 120. The number of cycles within the first phase is typically the same as the length of the input vector 112, as a result of which the entire input vector 112 can be read into the feedback shift register 140 during the first phase and an appropriate syndrome is ascertained. The number of cycles during the second phase is typically likewise the same as the length of the input vector. In the first phase, the input selector 120 is connected such that the output of the input interface arrangement 102 is connected to the input register element of the feedback shift register 140. In the second phase, the input selector 120 is connected such that the output of the majority decision-making unit 160 is connected to the input register element of the feedback shift register 140 (corresponding position/configuration of the input selector 120 is indicated as a dashed line in FIG. 1).

In some exemplary embodiments, the decoder 100 can be controlled or instructed to perform another intermediate step between the first phase and the second phase, with the auxiliary information memory 380 and the reference syndrome combiner 384 being able to be used. During this intermediate step, the simplex code syndrome—ascertained during the first phase—of the input vector 112 can be combined with a piece of auxiliary information. By way of example, the reference syndrome combiner 384 can be used to perform bit-by-bit XORing with the syndrome that is present in the feedback shift register 140 and the auxiliary information. By way of example, the auxiliary information may be related to a reference form and may therefore, within the context of coding theory, provide a piece of redundancy information that supports the error correction of the ascertained form. As mentioned above, although the form of the physical unclonable properties of the physical objects 2 or 3 that is ascertained at the current time is very similar to the reference form ascertained at an earlier time, it is nevertheless usually somewhat different therefrom. Similarly to transmission of a piece of information via a noisy channel, the reference form can be regarded as the original message and the form of the physical unclonable properties that is ascertained at the later time can be regarded as a noisy received message. As in the case of the transmission of information via a noisy channel, it is possible, as it were at the sender end (in the case of the PUF reconstruction that is to say at the time of ascertainment of the reference form), to ascertain a piece of redundancy information or the aforementioned auxiliary information, which are made available to the receiver end (in the case of the PUF reconstruction: later time at which the ascertained form of the physical unclonable properties of the physical object 2 or 3 are ascertained) for the purposes of error detection and/or correction. For this purpose, the auxiliary information can be stored on or in the physical object 2 or 3, e.g. in a special ROM area of the electronic component 3 or within a special area or a special track on the CD-ROM, DVD-ROM, Bluray-Disk, etc. 2. As indicated in FIG. 3 by a dashed line, the auxiliary information or the reference syndrome can be loaded from the physical object 2 or 3 into the auxiliary information memory 380 of the decoder 100. Alternatively, the auxiliary information or the reference syndrome can also be transmitted directly from the physical object 2; 3 to the reference syndrome combiner. As a further option, it is also conceivable for the auxiliary information to be transmitted via a communication network, for example, or to be input by a user using a keyboard.

In addition, the decoder 100 may comprise a clock generator that is configured to provide a clock signal at least for the feedback shift register 140 in order to read the register vector into the feedback shift register 140 element by element.

In addition, the decoder may comprise a controller that is configured to provide control signals for the feedback shift register 140 and the input selector 120. In this case, these control signals may correspond at least to a first operating phase and a second operating phase of the decoder 100. During the first operating phase, a current form (or a corresponding input vector 112) of the physical unclonable properties can be read into the feedback shift register 100. In the second operating phase, the decision vector can then be read into the feedback shift register as a register vector.

Figure 4:
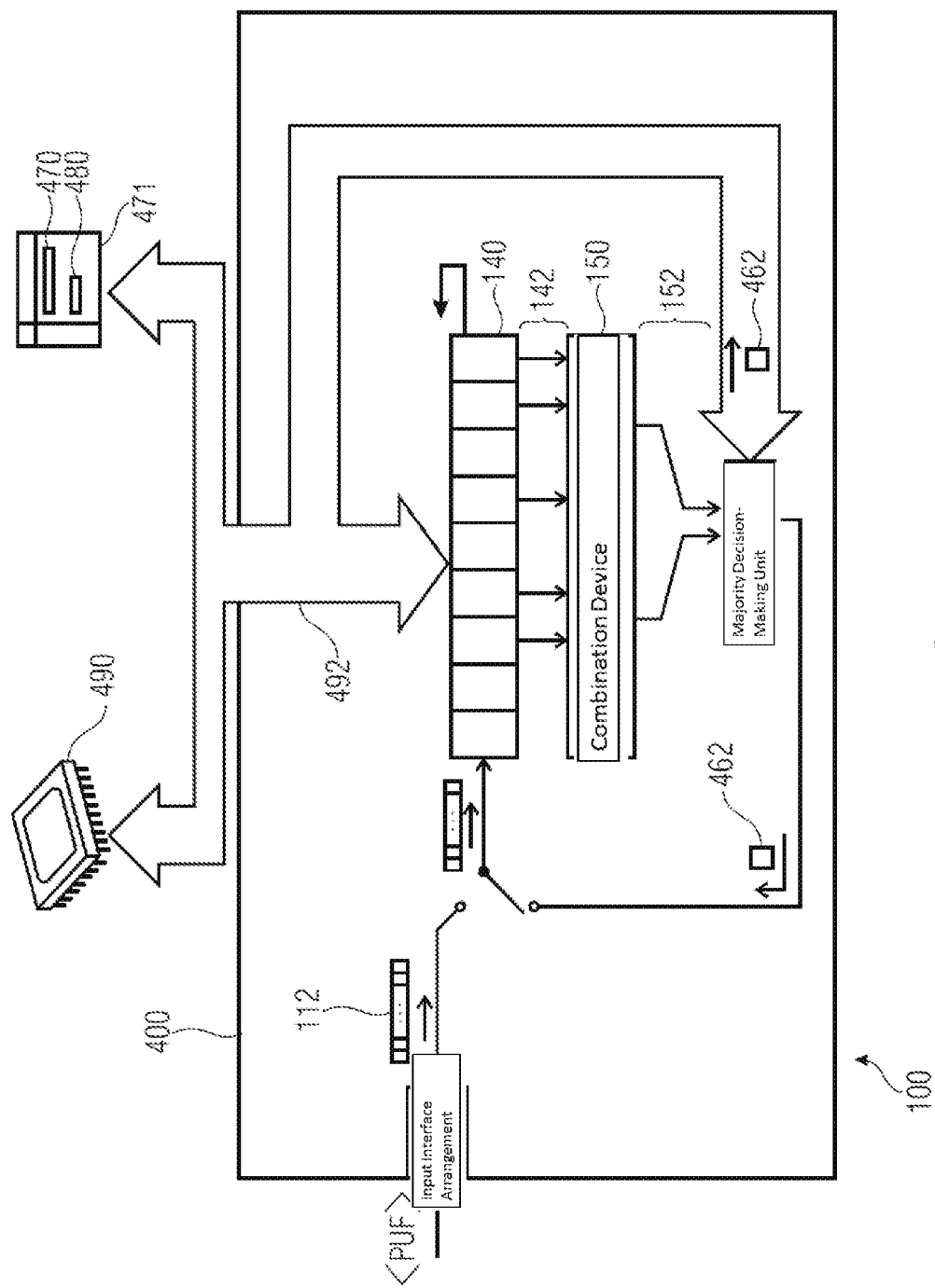
FIG. 4 shows a schematic block diagram of a decoder based on a further exemplary embodiment with a data bus for communication with a processor and a memory element for software-assisted performance of at least some calculations and/or data manipulations.

FIG. 4 shows a schematic block diagram of a decoder 100 that provides the option of performing at least some of the data processing steps and manipulations that are to be performed using a universal, programmable processor 490. The processor 490 is typically a separate component from the decoder 100. FIG. 4 also shows a data memory 471 as a separate component from the decoder 100, which component may be the main memory of a computer system or generally of a data processing system, for example. The decoder 100 is connected to the processor 490 and to the data memory 471 by means of a bus 492. By way of example, the data memory 471 may comprise a memory area 470 for the decision vector. The majority decision-making unit 160 can use the bus 492 for sending individual decision results 462 to the memory area 470 within the data memory 471, where they are stored according to their order. The storage operation can be performed by the processor 490 in this case. The data memory 471 may also have a second memory area 480 for the auxiliary information (i.e. the reference syndrome). By way of example, the auxiliary information can be read from the physical object 2; 3 and loaded into the second memory area 480. After the first phase of the PUF reconstruction has been performed, the processor 490 can both read the syndrome that has just been determined (corresponds to the currently ascertained form of the physical unclonable properties) from the feedback shift register 140 and the auxiliary information from the second memory area 480. The processor 490 can combine the relevant syndrome and the auxiliary information with one another, e.g. by means of bit-by-bit XORing. The result is then transmitted back to the feedback shift register 140 via the bus 492.

Figure 5:
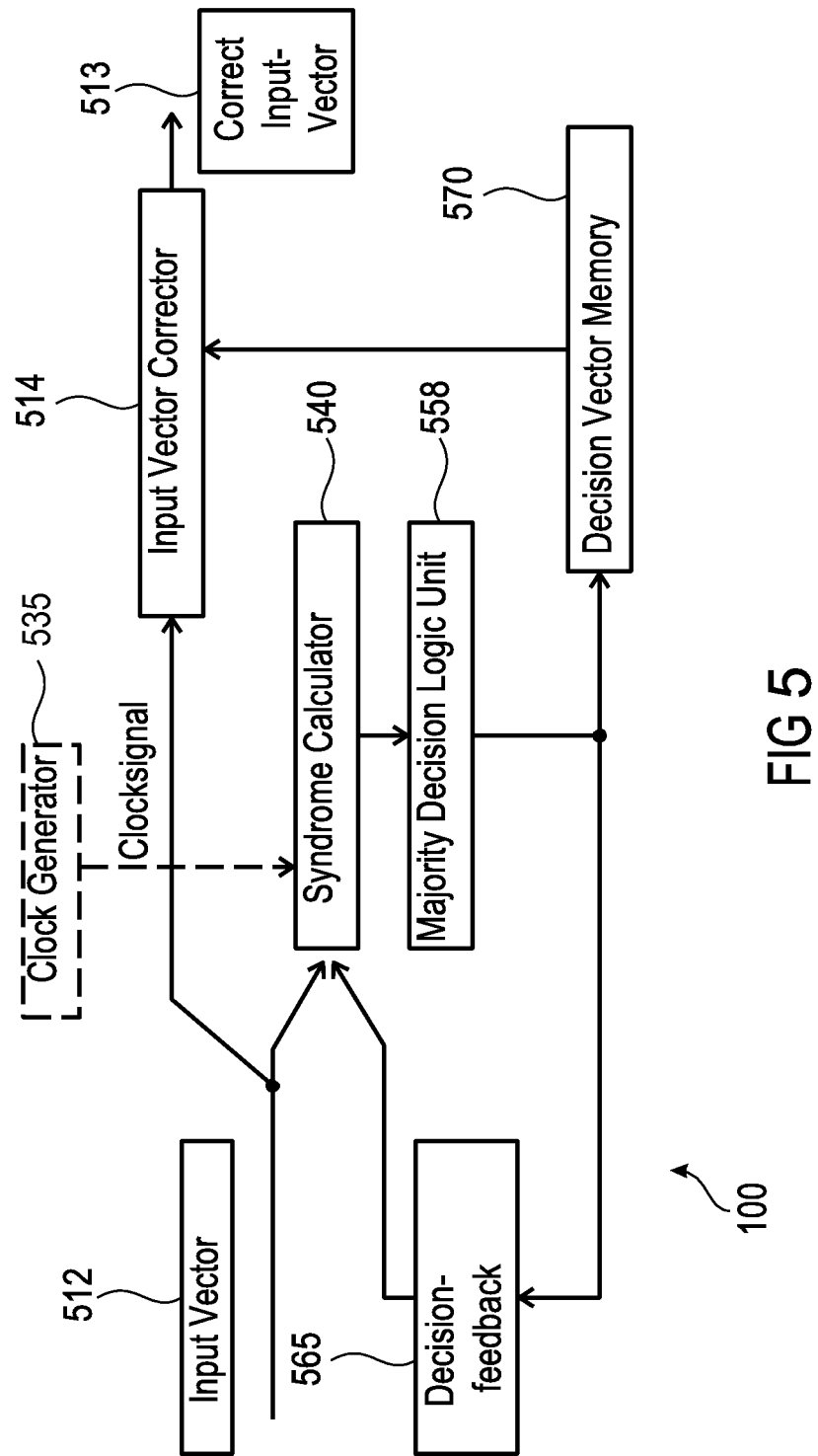
FIG. 5 shows a schematic block diagram of a decoder based on a further exemplary embodiment.

FIG. 5 shows a schematic block diagram of a decoder 100 that, for the sake of simpler comprehension and explanation, is represented by means of the functions of the individual components and is described below. The decoder 100 can receive an input vector 512 that corresponds to a currently ascertained form of the physical unclonable properties of the physical object 2; 3. The input vector 512 is supplied to a syndrome calculator 540. The syndrome calculator 540 is configured to calculate an appropriate syndrome for the input vector 512 that has been fed in, this syndrome calculation being executed on the basis of the simplex code. In other words, the syndrome calculator 540 is configured to take the input vector as a basis for determining an appropriate simplex code syndrome. The relevant syndrome is supplied to a majority decision logic unit 558 that algebraically combines particular syndrome elements with one another on the basis of a particular scheme at first so as to obtain a plurality of intermediate values. This combination of the syndrome elements is disjunct, i.e. each syndrome element is used for calculating no more than one of the intermediate values. This plurality of intermediate values is evaluated to determine a value that occurs most frequently within the plurality of intermediate values—thus, a majority decision is made or threshold-decoding is performed. If the intermediate values have binary encoding, it suffices to sum the plurality of intermediate values and to check whether the sum is greater than half the number of the plurality of intermediate values. In other words, the majority decision logic unit is configured to evaluate a current state of the syndrome calculator (that is to say the currently available simplex code syndrome) during each clock cycle (at least when the majority decision logic unit 558 is active, typically during the second phase of the PUF reconstruction) and to use disjunct evaluation of state elements and to use a majority decision to determine a current decision result.

The decoder 100 furthermore comprises a decision feedback loop 565 that is configured to feed back the current decision result to an input of the syndrome calculator 640 during at least one phase (the second phase) of a decoding cycle, as a result of which the syndrome calculator is configured, during this phase, to determine a respective decision syndrome on the basis of the position results that are fed back in succession per cycle.

The decision results progressively ascertained by the majority decision logic unit are also transmitted to a decision vector memory 570 that buffer-stores them. The decision vector memory 570 is configured to store the decision results determined during the at least one phase (second phase) as elements of a decision vector. When as many decision results as the input vector 512 has vector elements have been ascertained, the decision vector stored in the decision vector memory 570 is used by an input vector corrector 514 in order to combine it with the input vector 512 and in this way to provide a corrected input vector 513. The reason is that the decision vector can be regarded as a correction vector, as a result of which the corrected decision vector 513 can be ascertained by means of bit-by-bit XORing of the input vector 512 and the decision vector, for example.

In addition, the decoder 100 may comprise a clock generator 535 that provides a clock signal for the syndrome calculator and possibly also other components. The decision vector memory 570 can sometimes likewise use the clock signal to store the decision results provided by the majority decision logic unit 558 at the correct time (i.e. one decision result per clock cycle).

Figure 6:
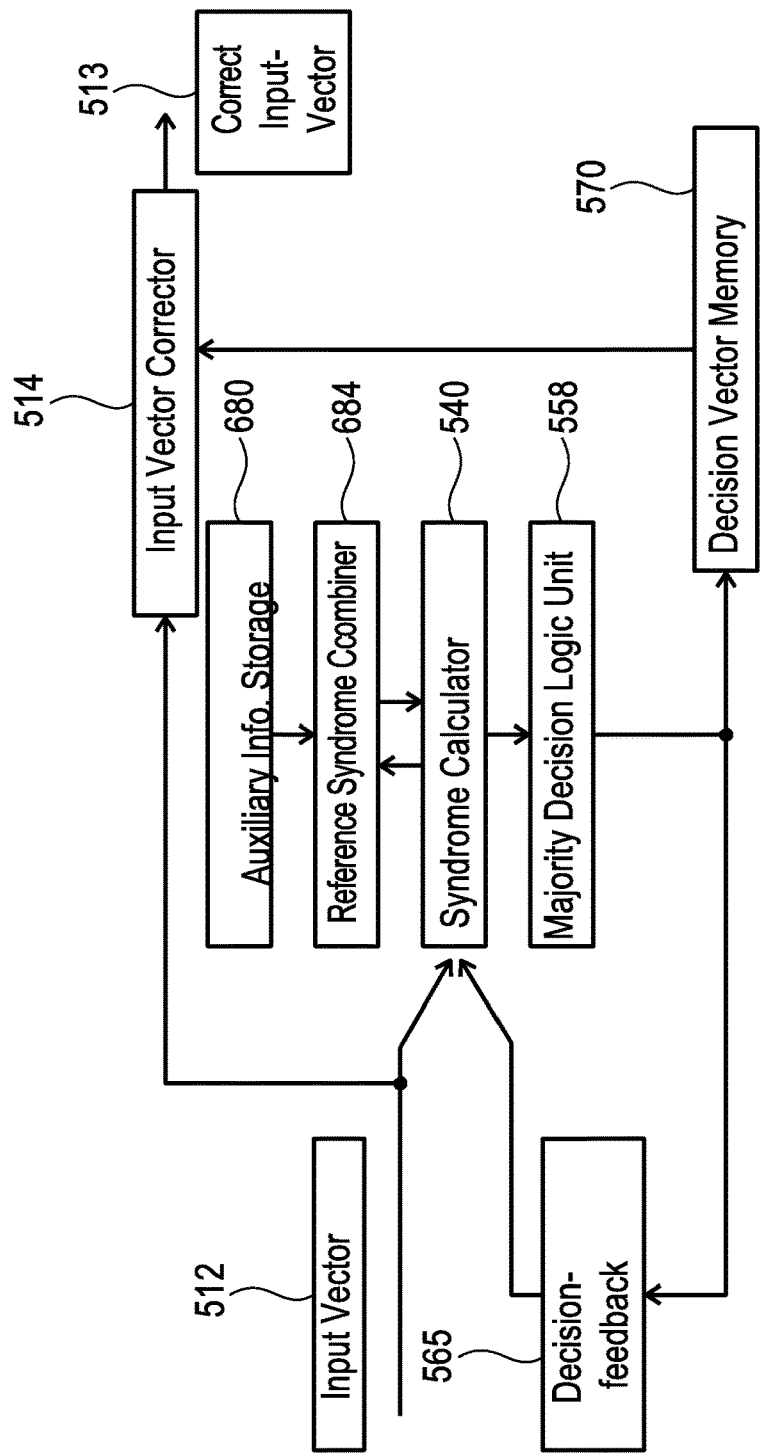
FIG. 6 shows a schematic block diagram of a decoder based on a further exemplary embodiment, which is distinguished from the exemplary embodiment shown in FIG. 5 by the presence of an auxiliary information memory and a reference syndrome combiner.

FIG. 6 shows a schematic block diagram of a decoder 100 that, in addition to the components already shown in FIG. 5, also has an auxiliary information memory 680 and a reference syndrome combiner 684. The auxiliary information memory 680 is configured to store a reference syndrome that corresponds to a reference form of the physical unclonable properties of the physical object. The reference syndrome combiner 684 is configured to combine the reference syndrome with the state of the syndrome calculator 540 in response to an appropriate control signal.

The decoders 100 shown in FIGS. 5 and 6 may furthermore comprise a controller that is configured to provide control signals for the syndrome calculator 540 that correspond at least to a first operating phase and a second operating phase of the decoder 100. During the first operating phase, a current form of the physical unclonable properties can be read into the syndrome calculator 540. During the second operating phase, the decision vector can be read into the syndrome calculator 540 instead of the input vector 512.

The majority decision logic unit 558 may comprise a multiplicity of input interface elements and a multiplicity of output interface elements, wherein each of the output interface elements is linked to a subset of the multiplicity of input interfaces by means of an individual algebraic function. The subset does not overlap with other subsets that are prescribed to other outlet interface elements.

The decoder 100 may also comprise a monitoring device that is configured to monitor the state of the syndrome calculator 540 for a zero state and, upon detection of the zero state, to output a signal that indicates that all detectable errors within the input vector 512 have already been detected. In this case, the second phase of the error correction can be terminated prematurely in order to shorten the handling time and/or to reduce the energy consumption of the decoder.

As previously discussed, embodiments disclosed herein use of decoders that are based on the simplex code instead of the Golay-Code-based decoders. Inter alia, this involves the subsequent specification of two decoders that are based on the simplex code.

The first decoder relates to the (15,4,8) simplex Code. This code can be used to correct up to three bit errors in a bit sequence of length 15. The hardware costs for the decoder (without an interface register) are 120 GE.

The second proposed decoder relates to the (31,5,16) simplex Code. This decoder can be used to correct up to seven bit errors per bit sequence of length 31. The hardware area (without registers for input and output) is approximately 270 GE.

A true PUF value a is determined during the production of the chip, the CD-ROM, the DVD etc. (enrolment). An auxiliary vector b is calculated for a. The true PUF value a is also labeled as reference form in this text.

Let b be the syndrome of a, with the syndrome calculation taking place in the simplex code.

At a later time t, a new PUF request is made. A new PUF vector r is obtained. In this case, r is generally different than a. The aim is now to calculate or reconstruct the true (i.e. the original) PUF value a from the existing vector r and the auxiliary vector b.

The problem of reconstructing a from r, which is basically a problem from coding theory, can be solved using the threshold-encoding in the simplex code.

Figure 7:
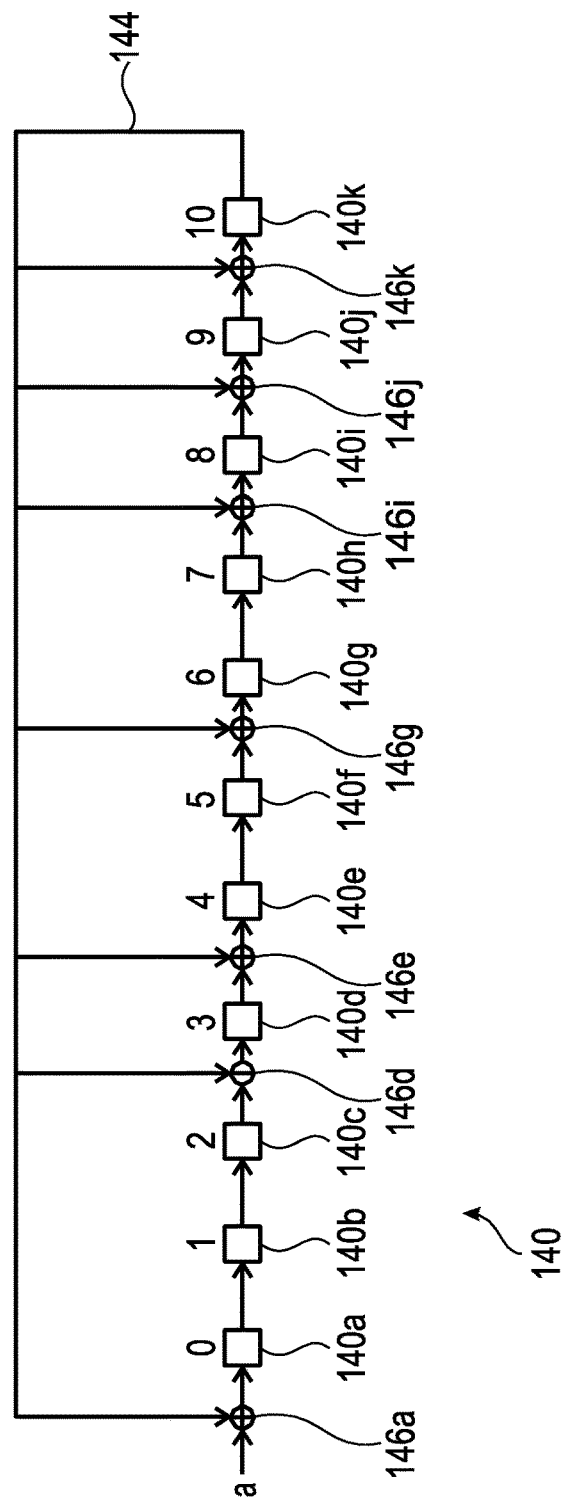
FIG. 7 shows a schematic diagram of a feedback shift register that implements a simplex code.
Figure 8:
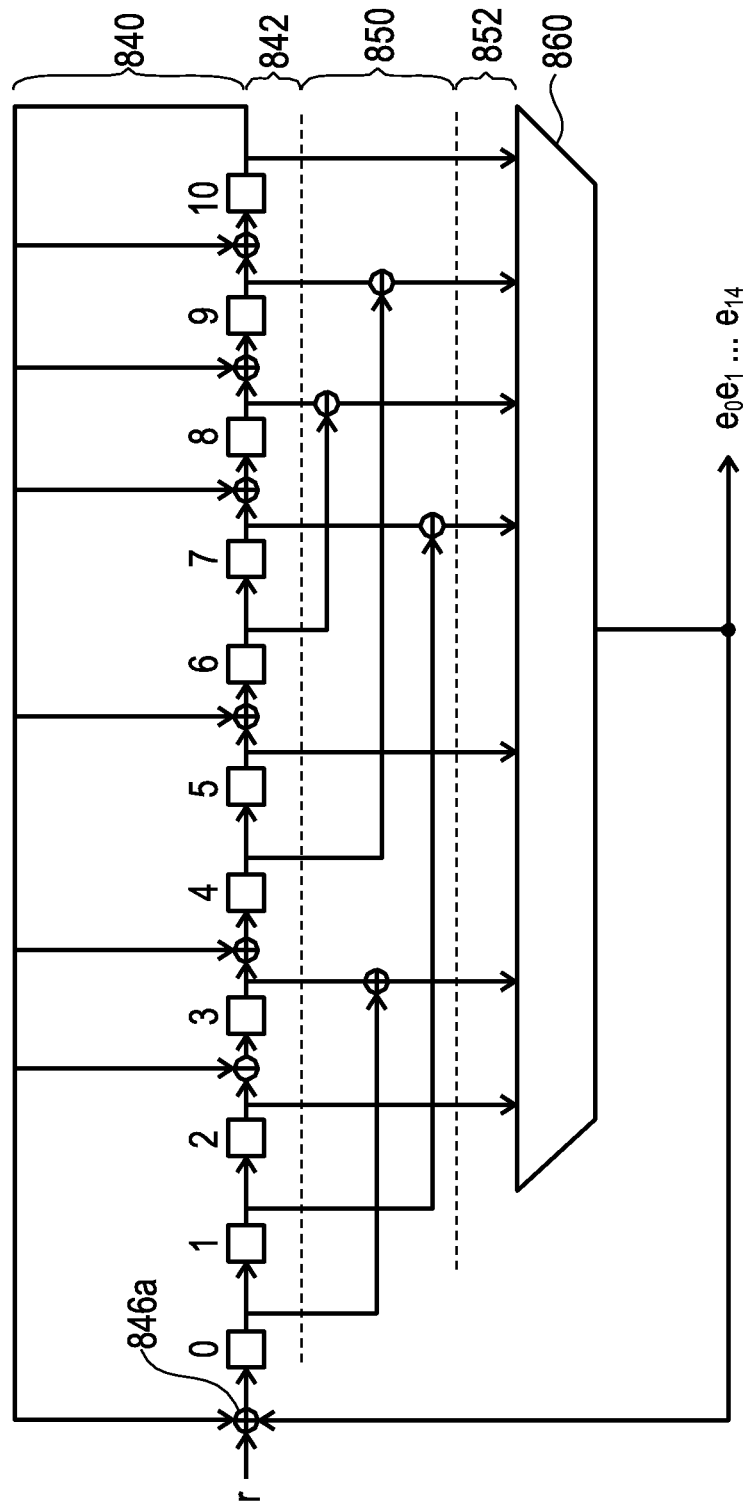
FIG. 8 shows a schematic diagram of a portion of a decoder, particularly of the feedback shift register, the combination device, the majority decision-making unit and the input selector.
Figure 9:
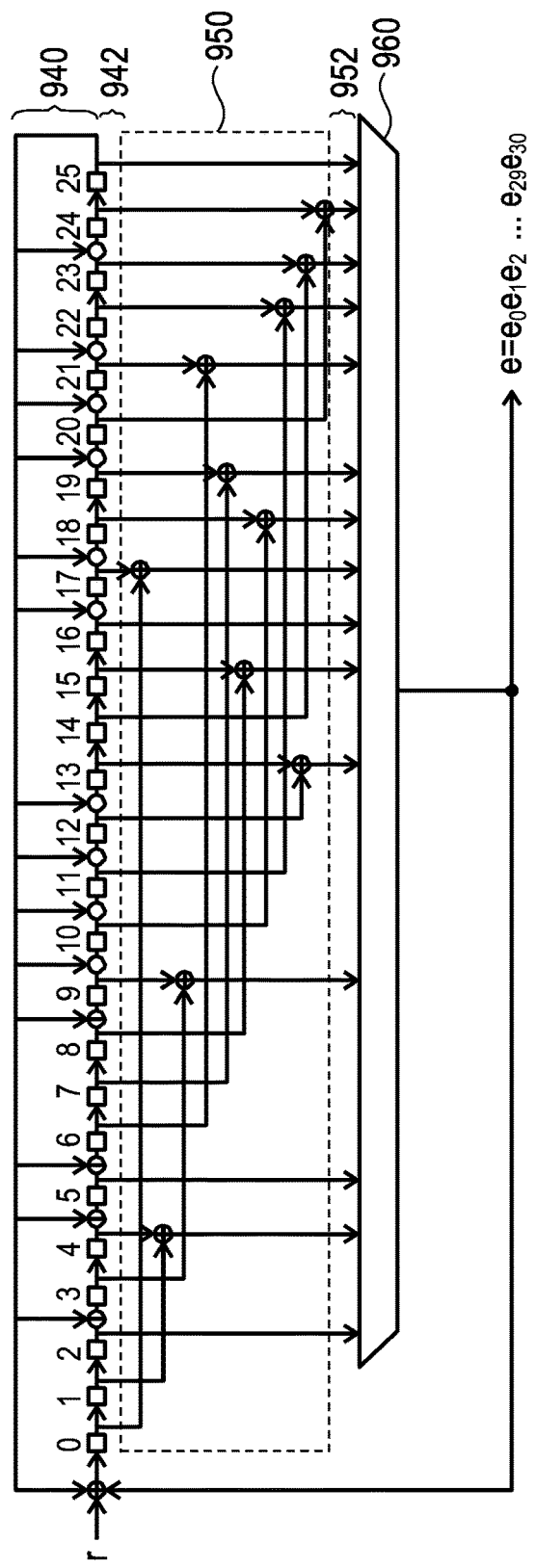
FIG. 9 shows a schematic diagram of a portion of a decoder based on exemplary embodiments, wherein the feedback shift register implements a (31, 5, 16) simplex code.

FIGS. 7 to 9 show schematic diagrams of the two decoders, FIG. 7 first of all showing only the feedback shift register 140 that implements a simplex code using the specially selected feedback loop.

FIG. 7 relates to the enrolment, i.e., the storage, programming or writing of data into/to the physical object. The feedback shift register 140 shown in FIG. 7 comprises a multiplicity of register elements 140a to 140k, the number of register elements in this exemplary embodiment being 11. The feedback shift register 140 also comprises a feedback loop 144 that feeds back the content of the last register element 140-k to a plurality of XOR gates 146a, 146d, 146e, 146g, 146i, 146j, 146k that are arranged between some of the register elements 140a-k. In FIG. 7, the reference vector (the true PUF value) a is fed into the feedback shift register 140 as a register vector via the input gate 146a and the input register element 140a. Specifically, the following actions are performed: The auxiliary vector b is calculated by: (1) Initializing the shift register 140 at 000 0000 0000 and (2) feeding in the true PUF value $a=a_0 a_1 \ldots a_{14}$. The shift register 140 now contains the auxiliary information $b = b_0 b_1 \ldots b_{10}$.

FIG. 8 shows a partial schematic diagram of a decoder for the (15, 4, 8) simplex code. FIG. 8 shows the following: the feedback shift register 840, a controllable XOR gate 846a, the combination device 850 and the majority decision-making unit 860. Furthermore, the reference symbol 842 denotes the relevant syndrome that corresponds to a register vector r that is fed into the feedback shift register. The reference symbol 852 denotes the combination vector that is provided by the combination device 850 and that is used as an input for the majority decision-making unit 860. The decision results are denoted by $e_0 e_1 \ldots e_{14}$ in FIG. 8.

In a first state, the controllable XOR gate 846a can XOR the input coming from the left ("r") and the input coming from the top (feedback from register element no. 10). In a second state, the controllable XOR gate can perform an XOR function between the input coming from the top (feedback from register element no. 10) and the input coming from the bottom (feedback from majority decision-making unit 860). Hence, the controllable XOR gate 846*a* can take on the function of the input selector 120. It should be noted that such a controllable XOR gate having three inputs can sometimes be implemented with less hardware complexity than two normal XOR gates and a selector switch as input selector 120. The decoder can now be controlled to perform the following steps: (1) Initialize the shift register 840 at 000 0000 0000 (2) Feed the current PUF value $r=r_0 r_1 \ldots r_{14}$ (thereafter the shift register 840 contains the syndrome S(r)) (3) Add the auxiliary information $b=b_0 b_1 \ldots b_{10}$ (4) Initialize the shift register at b+S(r) (5) The decoder outputs (progressively or cyclically) the error vector $e=e_0 e_1 \ldots e_{14}$ (6) The true PUF value is obtained from a=r+e.

FIG. 9 shows a schematic diagram of a decoder for the (31,5,16) simplex Code. The decoder comprises a feedback shift register 940 having 26 register elements. At a parallel output of the feedback shift register 940, the syndrome 942 corresponding to the register vector that has been fed in can be transferred to the combination device 950. The output of the combination device 950 provides the combination vector 952, which in turn is used as an input for the majority decision-making unit 960. Upon every clock cycle, which is used to advance the feedback shift register 940 during the second operating phase, a new decision result is produced at the output of the majority decision-making unit 960. When 31 clock cycles or cycles have been performed during the second operating phase, the decision results $e_0 e_1 \ldots e_{30}$ are thus available, which together form the decision vector or correction vector e.

An example is provided below for the purposes of illustration. First, a few principles relating to simplex codes are presented from coding theory. Consider the (7,3,4) simplex Code as an exemplary. The length of the codewords is 7. The code has the dimension 3, i.e. there are a total of $2^3=8$ different codewords. The code is made up of all bit sequences that satisfy the linear recursion formula: B(n+3)= B(n+1)+B(n), where B(0), B(1), B(2) are arbitrary initial values. For the three initial values, a further four sequence elements are calculated. In this way, the following eight codewords are obtained:

C0=0 0 0 0 0 0 0;
C1=0 0 1 0 1 1 1;
C2=0 1 0 1 1 1 0;
C3=1 0 1 1 1 0 0;
C4=0 1 1 1 0 0 1;
C5=1 1 1 0 0 1 0;
C6=1 1 0 0 1 0 1;
C7=1 0 0 1 0 1 1.

Two respective different codewords differ in four coordinates in each case. Therefore, the code has the minimum distance 4. Should a bit in one of the codewords be erroneous (for example as a result of transmission of the codeword via a channel), this bit can be explicitly corrected. The matrix $$H = \begin{matrix} 1 & 0 & 0 & 0 & 1 & 1 & 0 \\ 0 & 1 & 0 & 0 & 0 & 1 & 1 \\ 0 & 0 & 1 & 0 & 1 & 1 & 1 \\ 0 & 0 & 0 & 1 & 1 & 0 & 1 \end{matrix}$$

is called the check matrix (parity check matrix) for the code under consideration. The statement H C^T=0 is true for all codewords C. (C^T denotes the transposed vector for C. C is a row vector, C^T is a column vector.) Let r be an arbitrary 7-bit vector. In that case, the analog product of the check matrix H and the column vector r^T is the syndrome of r: S(r)=H r^T.

Figure 10:
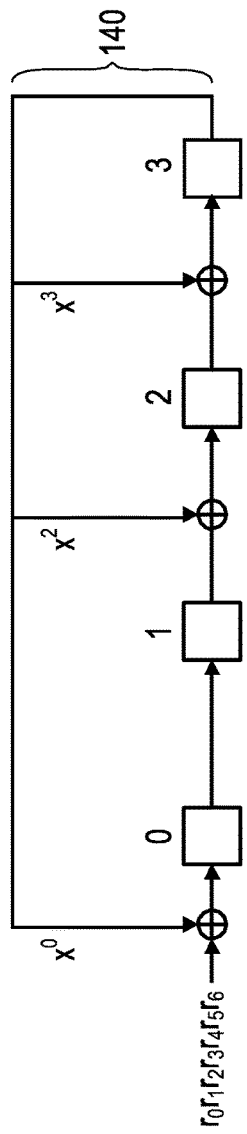
FIG. 10 shows a schematic diagram of a feedback shift register for a (7, 3, 4) simplex code.

The code is linear. The sum of two respective codewords is again a codeword, e.g., C1+C2=0 1 1 1 0 0 1=C4. Furthermore, the code is cyclic: if the bit entries in a (any) codeword are cyclically shifted to the right (or to the left), a codeword is always obtained again, e.g., R(C0)=0 0 0 0 0 0 0 and R(C6)=R(1 1 0 0 1 0 1)=(1 1 1 0 0 1 0)=C5. The function R( ) denotes the cyclic right shift of the bit entries. Each cyclic code has a generator polynomial g(x). The generator polynomial for the present code is $g(x)=x^4+x^3+x^2+1$. The generator polynomial g(x) defines the shift register that is shown schematically in FIG. 10. The degree of g(x) is 4, and therefore the shift register has four cells. The coefficients 1, $x^2$, $x^3$ of the generator polynomial determine the feedback arrows. The shift register (SR) needs to be initialized at 0000. The vector r is then fed in—starting at r_6. After seven clock cycles, the syndrome (s_0, s_1, s_2, s_3) is located in the four shift register cells.

Error vector and error correction: Consider a codeword, e.g., the codeword C1=0 0 1 0 1 1 1. If errors occur during the transmission and storage (in the case of the PUF reconstruction: when the PUF value is determined again) of the codeword, this can be described by an appropriate error vector. Assume that an error occurs in the second coordinate in the codeword above, as a result of which the word (or the vector) r=0 1 1 0 1 1 1 is obtained from the codeword C1. In that case the associated error vector is given by e=0 1 0 0 0 0 0.

In order to correct the error that has occurred, the syndrome of r is first of all calculated for almost all decoding algorithms (error correction algorithms). The syndrome is then processed further, which is usually accomplished using a complex algorithm (particularly at a high error rate), which is costly to implement in hardware. (This applies to the important class of BCH codes, for example).

A few cyclic codes are threshold-decodable, however. The simplex code has this property. For these codes, the error vector can be calculated by a simple majority assessment of sums of particular syndrome coordinates.

Application to PUFs: Consider a 7-bit vector a. The vector a shall be the true PUF value. The syndrome S of a, that is to say S(a), is calculated. This is the auxiliary vector b. That is to say that b=S(a). Let r be the PUF value that was obtained for a current PUF request. A problem is how to reconstruct the true but unknown PUF value a from the existing vector r. An approach to this problem is to regard r as an erroneous version of a. There thus exists a 7-bit error vector e where a=r+e. This error vector e needs to be calculated. To this end, the syndrome S(r) is calculated. The auxiliary vector b is added to S(r). The result is: S(r)+b= S(r)+S(a)=S(r+a)=S(e). S(e) is the syndrome of the unknown error vector e. It should be noted that although neither a nor r are codewords, we have used the concept of the syndrome to attribute the PUF reconstruction problem to an error correction problem in the simplex code. It should additionally be noted that the two syndrome calculations can be accomplished in hardware using the above shift register 140.

Figure 11:
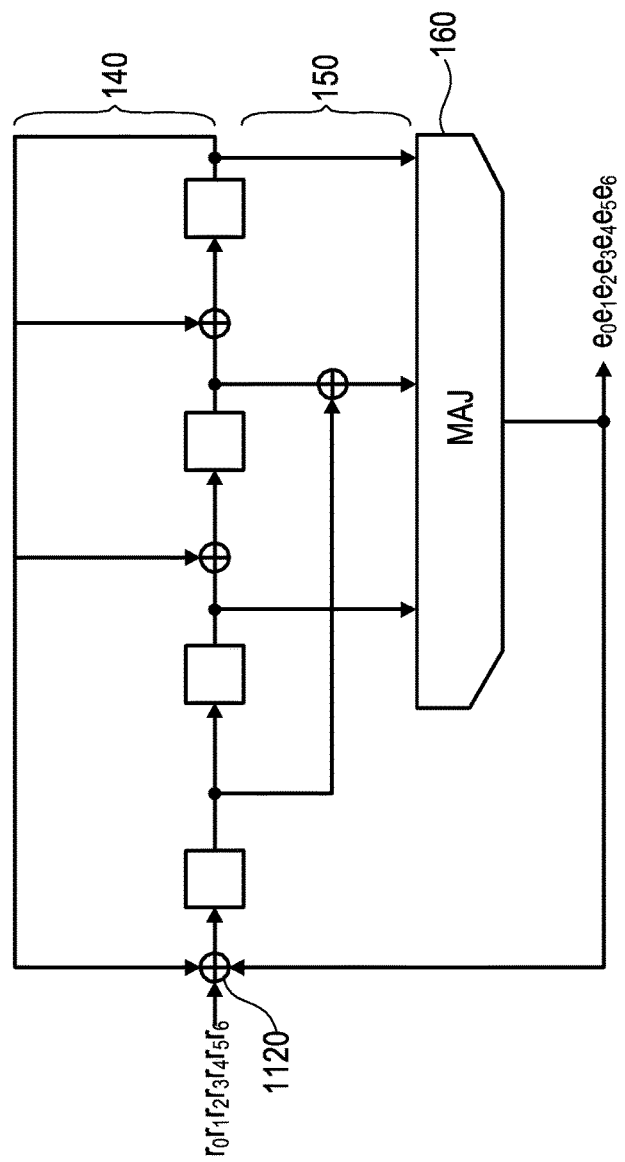
FIG. 11 shows a schematic diagram of a decoder based on exemplary embodiments for the (7, 3, 4) simplex code.

As a schematic diagram, the decoder has the appearance as shown in FIG. 11, for example. The application is as follows: (1) initialize the SR (shift register) 140 at 0000; (2) feed the vector r=r_0 r_1 . . . r_6 into the SR, starting at r_6, with the lower portion (combination device 150, majority decision-making unit 160 and/or feedback loop to the input selector 120) of the circuit being rendered inoperative; (3) subsequently, the SR 140 contains the syndrome S(r); (4) add the auxiliary vector b to the SR state S(r); (5) apply the filter logic 150, 160 to the current SR state, resulting in the output e_; (6) cyclically advance the decoder six times. Each time, the remaining bits e_5, e_4, . . . , e_0 are obtained. (7) If the SR is now in the all zero state, e=e_0 e_. . . e_6 is the error vector; (c)alculate the true PUF value a using a=r+e; (9) should the SR 140 not have the all zero state at the end, r cannot be corrected.

Figure 12:
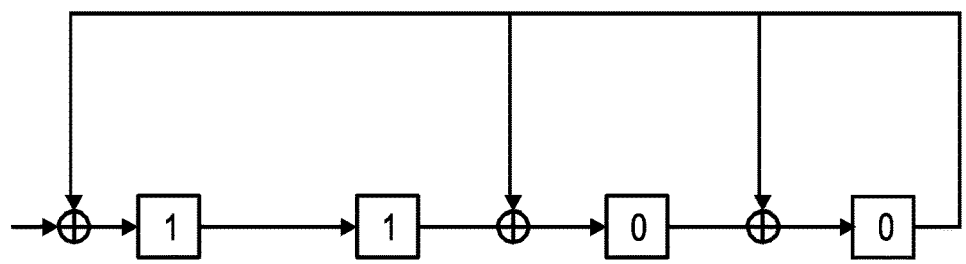
Figure 13:
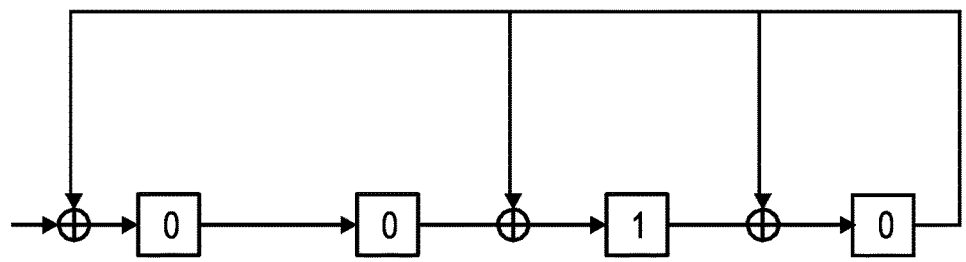
FIG. 13 shows a schematic diagram of the feedback shift register after an auxiliary vector has been added to the state of the shift register.
Figure 14:
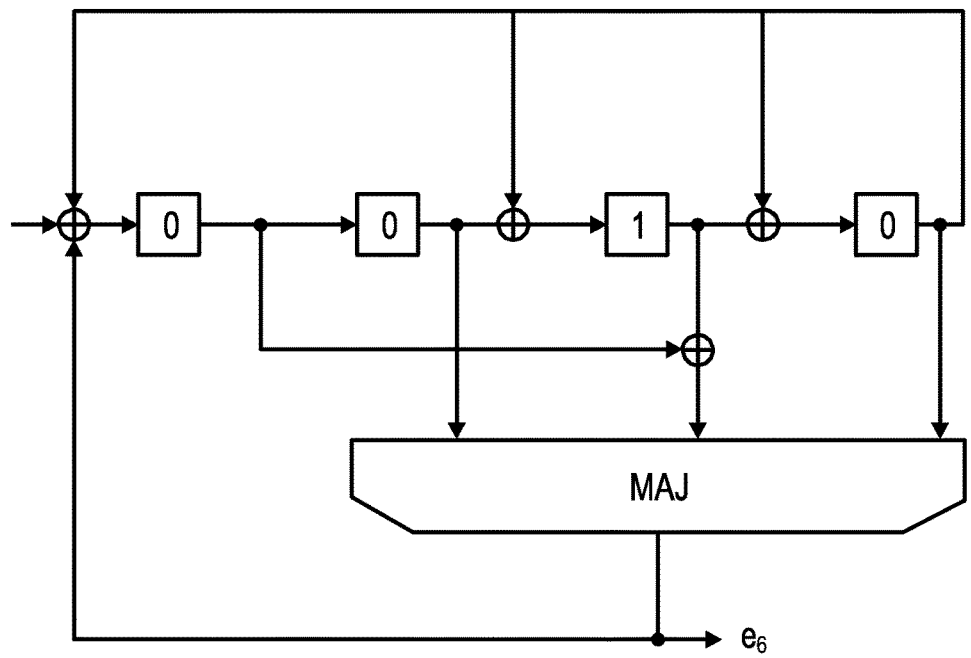
FIG. 14 shows a schematic diagram of an appropriate decoder, wherein the feedback shift register is in the same state as in FIG. 13.

This sequence is illustrated again using an example with reference to FIGS. 12 to 14.
 a=0 1 1 1 0 1 1; (a is unknown)
 b=S(a)=1 1 1 0; (b is auxiliary information)
 r=0 1 0 1 0 1 1. (b and r are known)

Feeding r into the (empty) SR results in the state that is shown in FIG. 12. The vector r is the current input vector for the currently ascertained form of the physical unclonable properties. In particular, the shift register now contains the simplex code syndrome S(r) of the ascertained form r.

Adding the auxiliary vector b=1 1 1 0 to the state in the shift register results in the state that is shown in FIG. 13. The auxiliary vector b is stored in plain text on/in the physical object, for example, and is therefore available for the PUF reconstruction. The auxiliary vector can alternatively be provided in another way.

The second operating phase and hence the actual error correction can now begin, as shown in FIG. 14.

The decoder is now cyclically advanced six times and in each clock cycle the filter logic unit (combination device 150 and majority decision-making unit 160) is evaluated. The states for the various clock cycles are reproduced in table 1 below.

TABLE 1

| Time | State | Bit of the error vector |
| --- | --- | --- |
| t = 0 | 0 0 1 0 | e_6 = Maj(0, 1, 0) = 0 |
| t = 1 | 0 0 0 1 | e_5 = Maj(0, 0, 1) = 0 |
| t = 2 | 1 0 1 1 | e_4 = Maj(0, 0, 1) = 0 |
| t = 3 | 1 1 1 0 | e_3 = Maj(1, 0, 0) = 0 |
| t = 4 | 0 1 1 1 | e_2 = Maj(1, 1, 1) = 1 |
| t = 5 | 0 0 0 0 | e_1 = Maj(0, 0, 0) = 0 |
| t = 6 | 0 0 0 0 | e_0 = Maj(0, 0, 0) = 0 |

The abbreviation "Maj" stands for "majority." The error vector is thus e=0 0 1 0 0 0 0. The sought true PUF value a is obtained from a=r+e=0 1 1 1 0 1 1.

It should be noted that it would also have been possible for the method to have been disregarded as early as after the time t=5. At the time t=5, the state 0000 was obtained in the SR. As soon as the all zero state is obtained, all subsequent states in the decoder are likewise all zero states. The resultant values of the error bits e_j are from that point onward likewise all=0.

Figure 15:
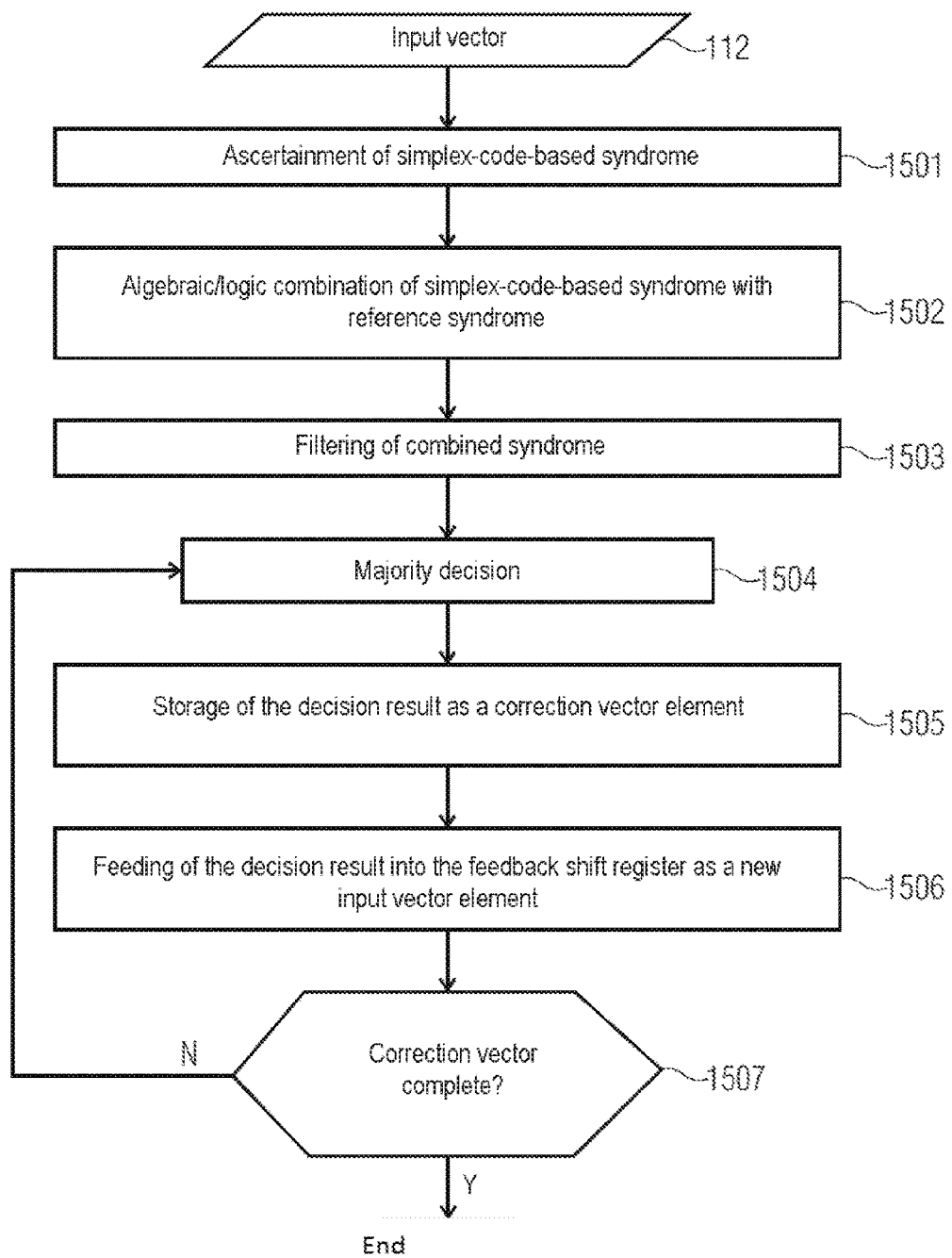
FIG. 15 shows a schematic flowchart for a method for evaluating an ascertained form of physical unclonable properties of a physical object based on exemplary embodiments.

FIG. 15 shows a schematic flow chart for a method for evaluating an ascertained form of physical unclonable properties of a physical object 2; 3. The method comprises a): ascertainment (1501) of a simplex-code-based syndrome using a feedback shift register (140) on the basis of an input vector (112) that corresponds to the ascertained form of the physical object 2; 3).

The method furthermore comprises b): algebraic combination (1502) of the simplex-code-based syndrome with a reference syndrome that corresponds to a reference form of the physical unclonable property in order to obtain a combined syndrome. The method also comprises c): filtering (1503) of the combined syndrome using a filter logic unit (150) to obtain a combination vector (152), wherein each combination vector element of the combination vector (152) is obtained from a subset of combined syndrome elements and wherein the subsets associated with the individual combination vector elements are disjunct.

In addition, the method comprises d): taking of a majority decision (1504) on the combination vector elements in order to obtain a decision result (162) that indicates what value occurs most frequently within the combination vector elements. The method also comprises e): storage (1505) of the decision result as a correction vector element of a correction vector, and f): feeding (1506) of the decision result (162) into the feedback shift register (140) as a new input vector element in order to obtain a modified simplex-code-based syndrome.

Finally, the method comprises g): repetition of steps c) to f), wherein the simplex-code-based syndrome modified upon preceding execution takes on the role of the combined syndrome. To establish whether steps c) to f) still need to be repeated at least once, a check is performed at a branch point (1507) to determine whether the correction vector or decision vector is already complete, for example. If the correction vector is not yet complete and steps c) to f) have accordingly not yet been executed as often as corresponds to the length of the input vector, the method returns to step c), which is labeled with the reference symbol (1503) in FIG. 15. Otherwise, the correction vector is complete and the method can be terminated. In the case of selected embodiments, termination of the method can be preceded by the input vector being combined with the correction vector, e.g. by bit-by-bit XORing, in order to obtain a corrected input vector.

Figure 16:
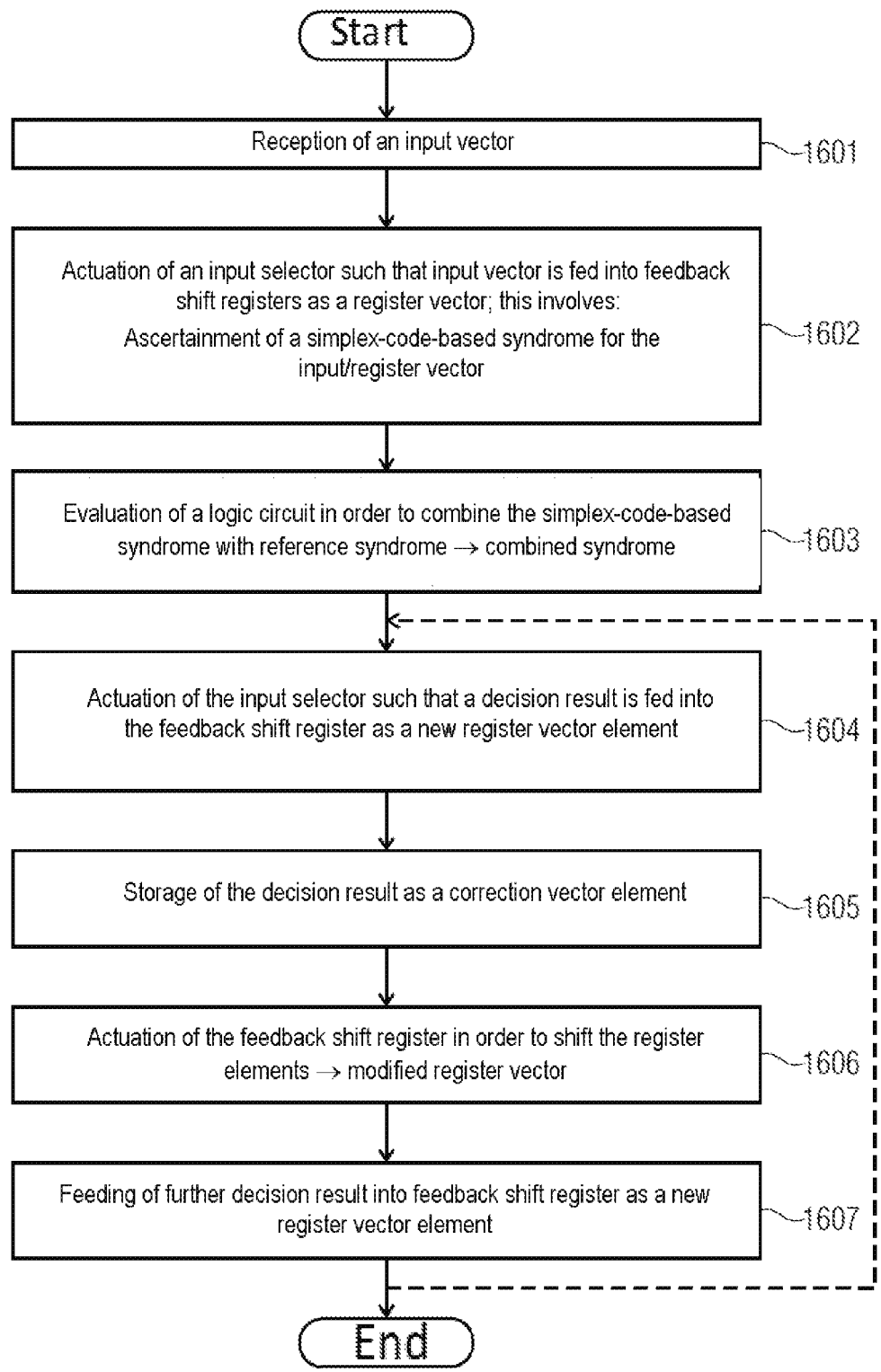
FIG. 16 shows a schematic flowchart for a method based on exemplary embodiments for operating a decoder.

FIG. 16 shows a schematic flowchart for a method for operating a decoder 100 for evaluating an ascertained form of physical properties of a physical object 2; 3. The method first of all comprises reception (1601) of an input vector 112 that corresponds to the ascertained form of the physical unclonable properties. In a step (1602), an input selector 120 for a feedback shift register 140 is controlled or actuated such that the input vector 112 is fed into the feedback shift register 140 as a register vector 132. During the feeding, the feedback shift register 140 ascertains a simplex-code-based syndrome for the register vector 132.

Next, in step (1603), a logic circuit 384 is evaluated in order to combine the simplex-code-based syndrome with a reference syndrome and in this way to obtain a combined syndrome. The reference syndrome corresponds to a reference form of the physical unclonable property.

The method further comprises a step (1604) for actuating the input selector 120 such that a decision result 162 is fed into the feedback shift register 140 as a new registration input. The decision result 162 is obtained from filtering of the combined syndrome using a filter logic unit 150 in order to provide a combination vector 152 and a majority decision on appropriate combination vector elements. The decision result 162 indicates what value occurs most frequently within the combination vector elements. In a step (1605), the decision result 162 is stored as a correction vector element.

In step (1606), the feedback shift register 140 is actuated to shift the register elements in order to obtain a modified register vector. The method further comprises a step (16070 of feeding a further decision result, which is ascertained by means of the filter logic unit 150 and the majority decision 160 on the basis of the modified register vector, into the feedback shift register 140 as a new register vector element.

Although some aspects have been described in connection with an apparatus, it is self-evident that these aspects are also a description of the corresponding method, as a result of which a block or a component of an apparatus can also be understood to mean a corresponding method step or a feature of a method step. Similarly, aspects that have been described in connection with or as a method step are also a description of a corresponding block or detail or feature of a corresponding apparatus.

Depending on particular implementation requirements, exemplary embodiments of the invention can be implemented in hardware or in software. The implementation can be performed using a digital storage medium, for example a floppy disk, a DVD, a Blu-ray Disc, a CD, a ROM, a PROM, an EPROM, an EEPROM or a FLASH memory, a hard disk or another magnetic or optical memory, on which electronically readable control signals are stored that can interact or do interact with a programmable computer system such that the respective method is carried out. Therefore, the digital storage medium may be computer-readable. Some exemplary embodiments based on the invention thus comprise a data storage medium that has electronically readable control signals that are capable of interacting with a programmable computer system such that one of the methods described herein is carried out.

In general, exemplary embodiments of the present invention may be implemented as a computer program product with a program code, wherein the program code is active such that it carries out one of the methods when the computer program product is executed on a computer. The program code may also be stored on a machine-readable medium, for example.

Other exemplary embodiments comprise the computer program for carrying out one of the methods described herein, wherein the computer program is stored on a machine-readable medium.

In other words, one exemplary embodiment of the method according to the invention is therefore a computer program that has a program code for carrying out one of the methods described herein when the computer program is executed on a computer. A further exemplary embodiment of the methods according to the invention is therefore a data storage medium (or a digital storage medium or a computer-readable medium) on which the computer program for carrying out one of the methods described herein is recorded.

A further exemplary embodiment of the method according to the invention is therefore a data stream or a sequence of signals that represents or represent the computer program for carrying out one of the methods described herein. The data stream or the sequence of signals may, by way of example, be configured to be transferred via a data communication link, for example via the Internet.

A further exemplary embodiment comprises a processing device, for example a computer or a programmable logic component, that is configured or customized to carry out one of the methods described herein.

A further exemplary embodiment comprises a computer on which the computer program for carrying out one of the methods described herein is installed.

In some exemplary embodiments, a programmable logic component (for example a field-programmable gate array, an FPGA) can be used to perform some or all functionalities of the methods described herein. In some exemplary embodiments, a field-programmable gate array can interact with a microprocessor in order to carry out one of the methods described herein. In general, the methods are carried out by an arbitrary hardware apparatus in some exemplary embodiments. This may be a piece of universally usable hardware such as a computer processor (CPU) or hardware that is specific to the method, such as an ASIC.

The exemplary embodiments described above are merely an illustration of the principles of the present invention. It is self-evident that modifications and variations of the arrangements and details described herein will be obvious to other persons skilled in the art. Therefore, it is intended that the invention be limited only by the scope of protection of the patent claims that follow and not by the specific details that have been presented using the description and the explanation of the exemplary embodiments herein.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open-ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A decoder for evaluating an ascertained form of physical unclonable properties of a physical object, the decoder comprising:
   a feedback shift register having a plurality of register elements configured to implement a simplex code and configured to take a register vector that is fed into the feedback shift register as a basis for determining an appropriate syndrome and storing it in the plurality of register elements;
   a combination device configured to algebraically combine at least one subset of the register elements of the feedback shift register and to provide a resultant combination result vector;
   a majority decision-making unit configured to ascertain a most frequently occurring value within the combination result vector and to provide it as a decision result; and
   an input selector configured to:
   in a first state, selectively connect an input of the feedback shift register to an input interface arrangement or to an output of the majority decision-making unit, to provide an input vector, wherein the input vector is provided by the input interface arrangement and corresponds to the ascertained form of the physical unclonable properties as a register vector and,
   in a second state, provide a decision vector, wherein the decision vector comprises the decision result and further decision results as a register vector.

2. The decoder of claim 1, further comprising a clock generator configured to provide a clock signal at least for the feedback shift register to read the register vector in the feedback shift register element by element.

3. The decoder of claim 1, further comprising: an auxiliary information memory configured to store a reference syndrome that corresponds to a reference form of the physical unclonable property; and a reference syndrome combiner configured to combine the reference syndrome with a register content of the feedback shift register.

4. The decoder of claim 1, further comprising a controller configured to provide control signals for the feedback shift register and the input selector that correspond at least to a first operating phase and a second operating phase of the decoder, wherein during the first operating phase a current form of the physical unclonable properties is read into the feedback shift register and during the second operating phase the decision vector is read into the feedback shift register as a register vector.

5. The decoder of claim 1, further comprising a decision vector memory and an input vector corrector, wherein the decision vector memory is configured to store the decision vector, and wherein the input vector corrector is configured to combine the input vector with the stored decision vector in order to provide a corrected input vector.

6. The decoder of claim 1, wherein the combination device comprises a multiplicity of input interface elements and a multiplicity of output interface elements, wherein each of the output interface elements is linked by means of an individual algebraic function to a subset of the multiplicity of input interfaces, and wherein the subset does not overlap with other subsets that are ascribed to other output interface elements.

7. The decoder of claim 1, wherein the combination vector comprises a multiplicity of combination vector elements, and wherein the combination device is configured to determine the combination vector elements in each case on the basis of current values of mutually disjunct subsets of the register elements.

8. The decoder of claim 1, also comprising a monitoring device configured to monitor the feedback shift register for a zero state and, upon detection of the zero state, to output a signal that indicates that all detectable errors within the input vector have already been detected.

9. A method for evaluating an ascertained form of physical unclonable properties of a physical object, the method comprising:
    ascertaining a simplex-code-based syndrome using a feedback shift register on the basis of an input vector that corresponds to the ascertained form of the physical object;
    combining the simplex-code-based syndrome with a reference syndrome that corresponds to a reference form of the physical unclonable property algebraically to obtain a combined syndrome;
    filtering the combined syndrome using a filter logic unit to obtain a combination vector, wherein each combination vector element of the combination vector is obtained from a subset of combined syndrome elements and wherein the subsets associated with the individual combination vector elements are disjunct;
    making a majority decision on the combination vector elements to obtain a decision result that indicates what value occurs most frequently within the combination vector elements;
    storing the decision result as a correction vector element of a correction vector; feeding the decision result as a new input vector element into the feedback shift register to obtain a modified simplex-code-based syndrome; and
    repeating the steps of filtering, making, storing and feeding, wherein the simplex-code-based syndrome modified during the preceding execution takes on the role of the combined syndrome.

10. The method of claim 9, wherein the input vector that corresponds to the ascertained form of the physical object has a length N, and wherein the filtering, making, storing and feeding are executed N-times in order to ascertain N correction vector elements of the correction vector.

11. The method of claim 10, further comprising:
    storing the input vector before or during the ascertainment of the simplex-code-based syndrome; and correcting the stored input vector using the correction vector.

12. The method of claim 11, further comprising: checking of whether at least one from the simplex-code-based syndrome, the combined syndrome and the modified simplex-code-based syndrome is equal to zero; and terminating the performance of the method if at least one from the simplex-code-based syndrome, the combined syndrome and the modified simplex-code-based syndrome is equal to zero.

* * * * *

UNITED STATES PATENT AND TRADEMARK OFFICE
CERTIFICATE OF CORRECTION

PATENT NO. : 10,135,468 B2  
APPLICATION NO. : 13/950894  
DATED : November 20, 2018  
INVENTOR(S) : R. Goettfert Page 1 of 1

It is certified that error appears in the above-identified patent and that said Letters Patent is hereby corrected as shown below:

On the Title Page

Abstract (57) Line 15, please change "vector and, and provides" to -- vector and, provides --

Signed and Sealed this
Twelfth Day of February, 2019

Andrei Iancu
*Director of the United States Patent and Trademark Office*